(12) United States Patent
Maret et al.

(10) Patent No.: US 8,134,810 B2
(45) Date of Patent: Mar. 13, 2012

(54) PROTECTIVE CIRCUIT ARRANGEMENT

(75) Inventors: Yannick Maret, Wettingen (CH); Daniel Schrag, Lufingen (CH); Richard Bloch, Nussbaumen (CH); Harald U. Mueller, Fulda (DE)

(73) Assignee: ABB Technology AG, Zurich (CH)

( * ) Notice: Subject to any disclaimer, the term of this patent is extended or adjusted under 35 U.S.C. 154(b) by 281 days.

(21) Appl. No.: 12/629,643

(22) Filed: Dec. 2, 2009

(65) Prior Publication Data

US 2010/0134930 A1    Jun. 3, 2010

(30) Foreign Application Priority Data

Dec. 3, 2008  (DE) .................... 10 2008 060 360

(51) Int. Cl.
*H02H 3/00* (2006.01)

(52) U.S. Cl. ................................. 361/1; 361/2

(58) Field of Classification Search .................. 361/1, 2, 361/6, 12
See application file for complete search history.

(56) References Cited

U.S. PATENT DOCUMENTS 4,717,849 A * 1/1988 Shigekane .................... 327/377
7,352,051 B2 * 4/2008 Bromberger .................. 257/566

* cited by examiner

*Primary Examiner* — Danny Nguyen
(74) *Attorney, Agent, or Firm* — Buchanan, Ingersoll & Rooney PC

(57) ABSTRACT

A protective circuit arrangement is disclosed for electrical equipment supplied, for example, from a conductor loop in surroundings subject to explosion hazards in process engineering installations. To suppress current flow from an energy store of the electrical equipment into the conductor loop, an exemplary cascadeable switchgear cell is disclosed, having a first transistor, which allows the loop current to pass, and a second transistor, which short-circuits a parasitic base-emitter diode of the first transistor.

5 Claims, 3 Drawing Sheets

PROTECTIVE CIRCUIT ARRANGEMENT

RELATED APPLICATION

This application claims priority under 35 U.S.C. §119 to German Patent Application No. 10 2008 060 360.0 filed in Germany on Dec. 3, 2008, the entire content of which is hereby incorporated by reference in its entirety.

FIELD

The disclosure relates to a protective circuit arrangement for electrical equipment supplied, for example, from a conductor loop in surroundings subject to explosion hazards in process engineering installations.

BACKGROUND INFORMATION

Known electrical equipment includes field devices used, for example, as measured-value sensors for pressure, temperature, flow rate and the like, as actuators for the control and operation of actuating elements such as valves or flaps, or as communication components for data interchange between interoperating automation-technological apparatuses.

Special safety regulations are applicable to the use of electrical equipment in surroundings subject to explosion hazards in process engineering installations.

For example, safety regulations may stipulate that in the event of a short circuit of the cores of the supplying conductor loop, no energy that may lead to the ignition of the surrounding atmosphere subject to explosion hazards is permitted to be fed back from the field device into the conductor loop. It is therefore desirable to permit the current flow toward the field device and to block the inverse current flow from the field device. It is generally familiar to the person skilled in the art, without separate proof being necessary, that diodes have a forward direction, in which the current flow through the diode is possible, and a reverse direction, in which the current flow through the diode is blocked, and consequently, when inserted into the supply line, diodes can satisfy the desire for feedback protection.

Furthermore, a redundant design of safety-relevant components is desirable for safety reasons. This gives rise to a series circuit composed of, for example, at least two, or owing to particular national regulations three, diodes. Such a known protective circuit is shown in FIG. 1. Proceeding from a voltage drop per diode in the forward direction of approximately 0.6 V at room temperature, a total voltage drop across the protective circuit according to FIG. 1 amounting to 1.8 V at room temperature results, which, as the ambient temperature decreases, rises up to 3.0 V at −40° C. In the case of a field device arrangement supplied via a current loop, the voltage drop across the protective circuit can lead to an undesirable reduction of the range of the current loop.

SUMMARY

A protective circuit arrangement for electrical equipment is disclosed, the protective circuit arrangement configured as at least one cascadeable switchgear cell wherein each switchgear cell comprises: a first supply current connection; a second supply current connection; a first control connection; a second control connection; a first transistor with a first base resistor; a second transistor having an identical zone sequence with a second base resistor, wherein an emitter of the first transistor is connected to the first supply current connection, a collector of the first transistor is connected to the second supply current connection, the first base resistor is connected between a base of the first transistor and the first control connection, a collector of the second transistor is connected to the base of the first transistor, an emitter of the second transistor is connected to the collector of the first transistor, and the second base resistor is connected between a base of the second transistor and the second control connection; wherein the first supply current connection of a first switchgear cell of the at least one cascadeable switchgear cell is configured for connection to a first connection terminal of a conductor loop of the electrical equipment, the second supply current connection of a last switchgear cell of the at least one cascadeable switchgear cell is configured for connection to the second connection terminal of the conductor loop via an electronic circuit of the electrical equipment; and wherein the first control connection of each switchgear cell is configured for connection to the second connection terminal of the conductor loop, and the second control connection of each switchgear cell is configured for connection to the first connection terminal of the conductor loop.

BRIEF DESCRIPTION OF THE DRAWINGS

The disclosure is explained in greater detail below on the basis of exemplary embodiments. In the drawings.

DETAILED DESCRIPTION

Figure 1:
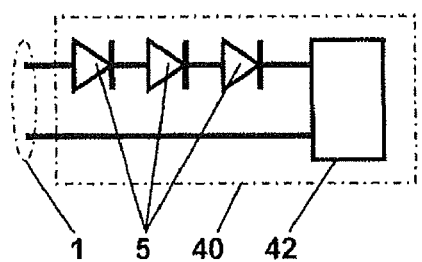
FIG. 1 shows a circuit diagram of a known protective circuit arrangement.

A protective circuit is disclosed which, in the forward direction, can have a smaller voltage drop than the known diode circuit.

Exemplary embodiments are based on two-pole electrical equipment supplied from a two-wire conductor loop.

An exemplary cascadeable switchgear cell includes a first transistor and a second transistor having an identical zone sequence with a base resistor in each case and is connected in between an electronic circuit of electrical equipment and a conductor loop in four-pole fashion. The switchgear cell can have a first and a second supply current connection and also a first and a second control connection.

The emitter of the first transistor can be connected to the first supply current connection, and the collector of the first transistor can be connected to the second supply current connection. The first base resistor can be connected between the base of the first transistor and the first control connection. The collector of the second transistor can be connected to the base of the first transistor. The emitter of the second transistor can be connected to the collector of the first transistor, and the second base resistor can be connected between the base of the second transistor and the second control connection.

The first supply current connection of the first switchgear cell can be connected to a first connection terminal of the conductor loop. The second supply current connection of the last switchgear cell can be connected to the second connection terminal of the conductor loop via the electronic circuit of the equipment. All first control connections can be connected to the second connection terminal of the conductor loop, and all second control connections can be connected to the first connection terminal of the conductor loop.

According to an exemplary embodiment, a plurality of switchgear cells can be cascaded in such a way that the first supply current connection of one switchgear cell is connected to the second supply current connection of the other, adjacent switchgear cell.

The two-wire line of the conductor loop can be connected to the first and the second connection terminals.

During use of an exemplary protective circuit arrangement as intended, the respective first transistor of each switchgear cell can be open for the supply current in the forward direction, and the respective second transistor can be turned off. In this case, the respective first transistors of each switchgear cell are in the saturation state.

In the case of a short circuit on the two-wire line, the respective second transistor of each switchgear cell becomes conducting and in this case, with its open collector-emitter path, keeps the collector-base junction of the respective first transistor in the off state. This reliably prevents the low-impedance discharge of all the energy stores in the electrical equipment via the short circuit on the two-wire line.

According to exemplary embodiments, the voltage drop across the opened collector-emitter path of the respective first transistor in saturation is much smaller than the voltage drop across a diode and, moreover, far less dependent on the temperature. Practical experiments have shown that less than 0.25 V is dropped across a protective circuit arrangement according to exemplary embodiments of the disclosure having three cascaded switchgear cells over the entire temperature range of interest. The influence of the protective circuit arrangement on the maximum possible line length of the two-wire line can thus be very small.

According to a further exemplary embodiment, the transistors can be embodied as metal oxide silicon field effect transistor (MOSFET). In accordance with the connection designations of MOSFET, the gate connection can be connected up instead of the base of the bipolar transistor, and the source connection and the drain connection can be connected up in any desired assignment instead of the collector and the emitter.

FIG. 1 illustrates the known protective circuit arrangement, already mentioned, for electrical equipment 40 on a two-wire line 1. The protective circuit arrangement includes a series circuit of three diodes 5 which are connected in the forward direction into a feed line to electronic circuit 42. In the case of a short circuit on the two-wire line 1, the feedback of energy from the electronic circuit 42 into the two-wire line 1 can be impacted by a blocking action of the diodes 5 in the reverse direction.

Figure 2:
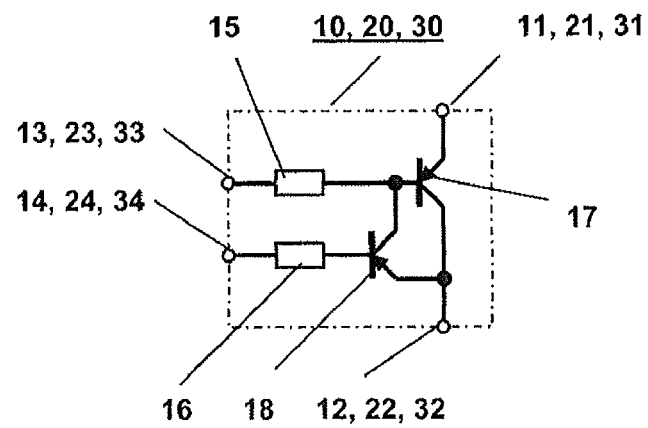
FIG. 2 shows a circuit diagram of a switchgear cell of an exemplary protective circuit arrangement according to the disclosure.

FIG. 2 shows a circuit diagram of a switchgear cell 10, 20, 30 of an exemplary protective circuit arrangement according to the disclosure.

The switchgear cell 10, 20, 30 comprises a first transistor 17 and a second transistor 18 having an identical zone sequence with respectively a base resistor 15 and 16. The switchgear cell 10, 20, 30 has a first supply current connection 11, 21, 31 and a second supply current connection 12, 22, 32 and also a first control connection 13, 23, 33 and a second control connection 14, 24, 34. The transistors 17 and 18 have the zone sequence PNP in this embodiment shown.

The emitter of the first transistor 17 is connected to the first supply current connection 11, 21, 31, and the collector of the first transistor 17 is connected to the second supply current connection 12, 22, 32. The first base resistor 15 is connected between the base of the first transistor 17 and the first control connection 13, 23, 33. The collector of the second transistor 18 is connected to the base of the first transistor 17. The emitter of the second transistor 18 is connected to the collector of the first transistor 17, and the second base resistor 16 is connected between the base of the second transistor 18 and the second control connection 14, 24, 34.

Figure 3:
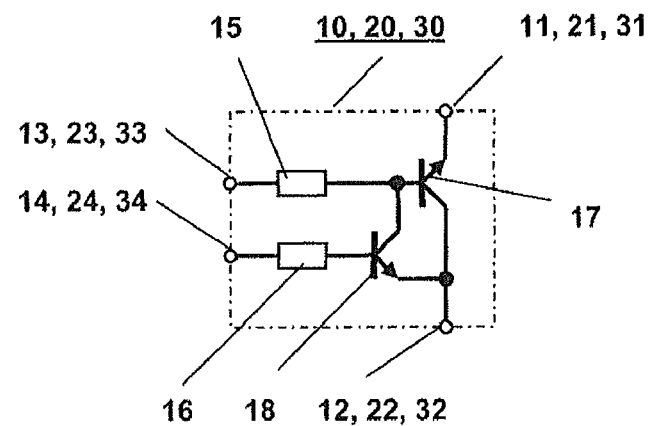
FIG. 3 shows a circuit diagram of an alternative switchgear cell of an exemplary protective circuit arrangement according to the disclosure.

Using identical reference symbols for identical means, FIG. 3 shows an alternative exemplary embodiment of the switchgear cell 10, 20, 30 according to the disclosure. In this case, the transistors 17 and 18 have the zone sequence NPN in this embodiment.

Figure 4:
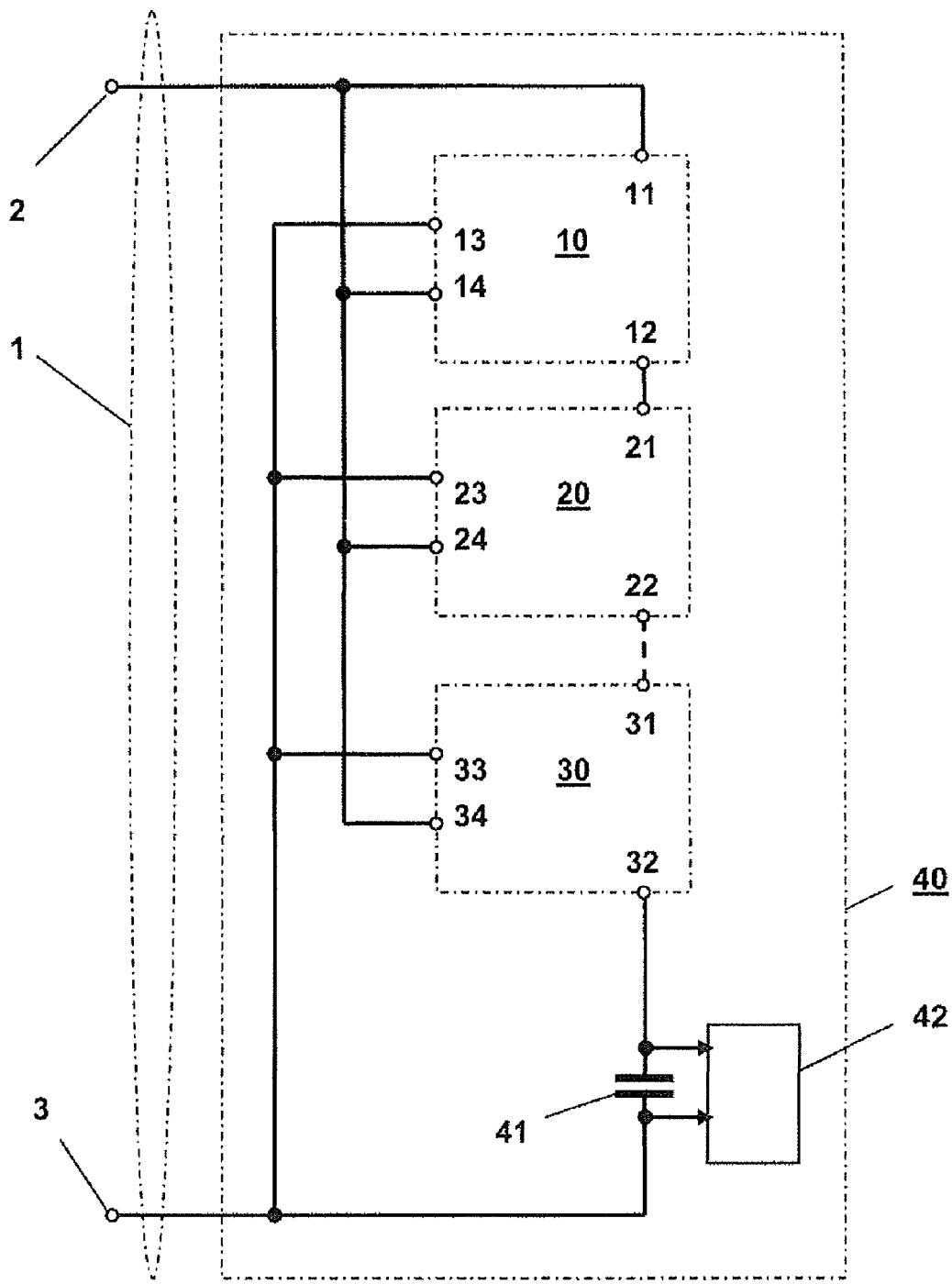
FIG. 4 shows a basic exemplary circuit diagram of electrical equipment on a two-wire line.

In accordance with the exemplary embodiments shown in FIG. 4, the electrical equipment 40 has an electronic circuit 42 and an energy store 41. In this case the energy store 41 can be present as a concentrated component in the form of a capacitor or in distributed form. The electrical equipment 40 is supplied with a DC current from a conductor loop 1 and for this purpose is connected to a first connection terminal 2 and a second connection terminal 3 of the conductor loop 1.

The four-pole switchgear cell 10, 20, 30 is connected in between the electronic circuit 42 of the electrical equipment 40 and the connection terminals 2 and 3 of the conductor loop 1. In order to ensure the desired safety in this embodiment, three switchgear cells 10, 20, 30 are connected in series in redundant fashion. In this case, the first supply current connection 11 of the first switchgear cell 10 is connected to the first connection terminal 2 of the conductor loop 1. The second supply current connection 32 of the last switchgear cell 30 is connected to the second connection terminal 3 of the conductor loop 1 via the electronic circuit 42 of the equipment 40. All first control connections 13, 23, 33 are connected to the second connection terminal 3 of the conductor loop 1, and all second control connections 14, 24, 34 are connected to the first connection terminal 2 of the conductor loop 1. The switchgear cells 10, 20, 30 are cascaded in such a way that the first supply current connection 21 of the second switchgear cell 20 is connected to the second supply current connection 12 of the adjacent first switchgear cell 10. The first supply current connection 31 of the third switchgear cell 30 is correspondingly connected to the second supply current connection 22 of the adjacent second switchgear cell 20.

The two-wire line of the conductor loop 1 is connected to the first and the second connection terminals 2, 3.

In a first exemplary embodiment of the protective circuit arrangement according to FIG. 4, the switchgear cells 10, 20, 30 are equipped with PNP transistors 17, 18 in accordance with the illustration in FIG. 2. In this case, the first connection terminal 2 has connected to it the positive pole, and the second connection terminal 3 the negative pole of the two-wire line carrying DC current.

In an alternative exemplary embodiment of the protective circuit arrangement according to FIG. 4, the switchgear cells 10, 20, 30 are equipped with NPN transistors 17, 18 in accordance with the illustration in FIG. 3. In this case, the first connection terminal 2 has connected to it the negative pole and the second connection terminal 3 the positive pole of the two-wire line carrying DC current.

Independently of the embodiment of the protective circuit arrangement, during the use of the protective circuit arrangement as intended, the respective first transistor 17 of each switchgear cell 10, 20, 30 can be open for the supply current in the forward direction, and the respective second transistor 18 is turned off. In this case, the respective first transistors 17 of each switchgear cell 10, 20, 30 are in the saturation state. In this operating state, the electronic circuit 42 of the electrical equipment 40 is supplied from the two-wire line as intended and the energy store 41 is charged.

In the case of a short circuit on the two-wire line, the respective second transistor 18 of each switchgear cell 10, 20, 30 becomes conducting and in this case, with its open collector-emitter path, keeps the collector-base junction of the respective first transistor 17 in the off state. This can reliably prevent the low-impedance discharge of all the energy stores 41 of the electrical equipment 40 via the short circuit on the two-wire line.

Figure 5:
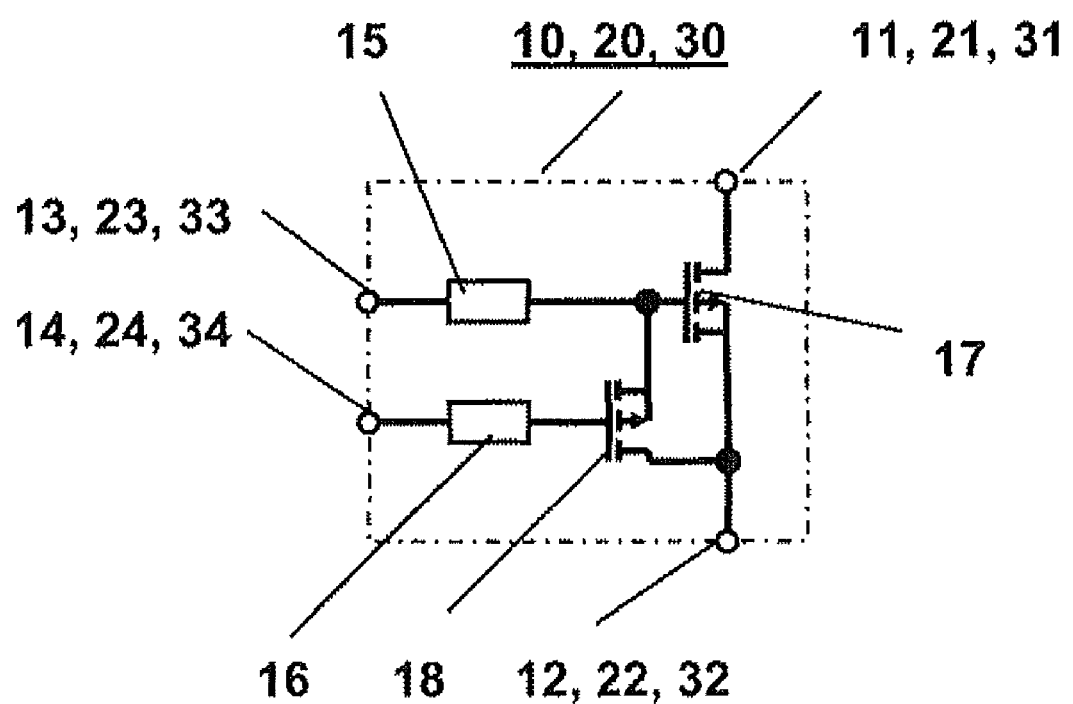
FIG. 5 shows an exemplary circuit diagram of a switchgear cell with MOSFETs.

Using identical reference symbols for identical means, FIG. 5 shows an exemplary switchgear cell having transistors 17 and 18 embodied as MOSFETs of the PMOS type. In this case, in accordance with the connection designations of MOSFETs, the drain connection of the first transistor 17 is connected to the first supply current connection 11, 21, 31, and the source connection of the first transistor 17 is connected to the second supply current connection 12, 22, 32. The first base resistor 15 is connected between the gate connection of the first transistor 17 and the first control connection 13, 23, 33. The source connection of the second transistor 18 is connected to the gate connection of the first transistor 17. The drain connection of the second transistor 18 is connected to the source connection of the first transistor 17, and the second base resistor 16 is connected between the gate connection of the second transistor 18 and the second control connection 14, 24, 34.

It is within the scope of the present disclosure to use any desired, suitable transistor. For example, it is within the scope of this disclosure to replace the MOSFETs of the PMOS type by MOSFETs of the NMOS type. Owing to the symmetrical design of MOSFETs, it furthermore lies within the scope of the disclosure to, for example, interchange the source connection of each transistor 17 or 18 with the drain connection of the same transistor 17 or 18.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| List of reference symbols | |
| --- | --- |
| 1 | Conductor loop |
| 2 | First connection terminal |
| 3 | Second connection terminal |
| 5 | Diode |
| 10, 20, 30 | Switchgear cell |
| 11, 21, 31 | First supply current connection |
| 12, 22, 32 | Second supply current connection |
| 13, 23, 33 | First control connection |
| 14, 24, 34 | Second control connection |
| 15 | First base resistor |
| 16 | Second base resistor |
| 17 | First transistor |
| 18 | Second transistor |
| 40 | Electrical equipment |
| 41 | Energy store |
| 42 | Electronic circuit |

What is claimed is:

1. A protective circuit arrangement for electrical equipment, the protective circuit arrangement configured as at least one cascadeable switchgear cell wherein each switchgear cell comprises:
    a first supply current connection;
    a second supply current connection;
    a first control connection;
    a second control connection;
    a first transistor with a first base resistor;
    a second transistor having an identical zone sequence with a second base resistor, wherein an emitter of the first transistor is connected to the first supply current connection, a collector of the first transistor is connected to the second supply current connection, the first base resistor is connected between a base of the first transistor and the first control connection, a collector of the second transistor is connected to the base of the first transistor, an emitter of the second transistor is connected to the collector of the first transistor, and the second base resistor is connected between a base of the second transistor and the second control connection;
    wherein the first supply current connection of a first switchgear cell of the at least one cascadeable switchgear cell is configured for connection to a first connection terminal of a conductor loop of the electrical equipment, the second supply current connection of a last switchgear cell of the at least one cascadeable switchgear cell is configured for connection to the second connection terminal of the conductor loop via an electronic circuit of the electrical equipment; and
    wherein the first control connection of each switchgear cell is configured for connection to the second connection terminal of the conductor loop, and the second control connection of each switchgear cell is configured for connection to the first connection terminal of the conductor loop.

2. The protective circuit arrangement as claimed in claim 1, comprising:
    a plurality of switchgear cells cascaded such that the first supply current connection of one switchgear cell is connected to the second supply current connection of another switchgear cell.

3. The protective circuit arrangement as claimed in claim 1, wherein the first and second transistors of at least one of the cascadeable switchgear cells are embodied as metal oxide silicon field effect transistors (MOSFETs), wherein a gate connection is connected up instead of the base of a bipolar transistor, and a source connection and a drain connection are connected up in any desired assignment instead of the collector and the emitter.

4. The protective circuit arrangement as claimed in claim 2, wherein the first and second transistors of at least one of the cascadeable switchgear cells are embodied as metal oxide silicon field effect transistors (MOSFETs), wherein a gate connection is connected up instead of the base of a bipolar transistor, and a source connection and a drain connection are connected up in any desired assignment instead of the collector and the emitter.

5. The protective circuit arrangement of claim 1, in combination with electrical equipment supplied from a conductor loop.

* * * * *